United States Patent [19]

Okazaki

[11] 4,152,238
[45] May 1, 1979

[54] DEVICE FOR REGULATING DRINKING WATER

[75] Inventor: Tatsuo Okazaki, Kamifukuoka, Japan

[73] Assignee: Kabushikigaisha OMCO, Saitama, Japan

[21] Appl. No.: 869,943

[22] Filed: Jan. 16, 1978

Related U.S. Application Data

[63] Continuation-in-part of Ser. No. 651,839, Jan. 23, 1976.

[51] Int. Cl.² ............................................. C02B 1/82
[52] U.S. Cl. .................................. 204/228; 204/151; 204/236; 204/241; 204/262; 204/301
[58] Field of Search ............... 204/301, 151, 229, 263, 204/252, 239, 23, 1 R, 271, 228, 236, 241, 262

[56] References Cited

U.S. PATENT DOCUMENTS

| | | | |
|---|---|---|---|
| 3,317,410 | 5/1967 | Croll et al. | 204/239 X |
| 3,623,969 | 11/1971 | Hushihara | 204/271 |
| 3,785,950 | 1/1974 | Newton et al. | 204/239 |
| 3,847,787 | 11/1974 | Okazaki et al. | 204/151 X |

Primary Examiner—Arthur C. Prescott
Attorney, Agent, or Firm—Frishauf, Holtz, Goodman and Woodward

[57] ABSTRACT

A device for regulating drinking water includes an electrolyzer divided into a negative electrode chamber and a positive electrode chamber by an unglazed partition, and electrodes disposed in the chambers and adapted to be energized by direct current for a prescribed period of time for separating water in the electrolyzer into two components having a hydroxyl radical in different densities, due to the electrolysis and electro-endosmose. The negative electrode has a heating element disposed in a hollow space formed in the negative electrode to warm up the water body in the electrolyzer at each time of the electrolysis. A thermistor, or the like, is electrically connected to the heating element to control the temperature of the water body in the electrolyzer and to prevent overheating of the negative electrode.

27 Claims, 15 Drawing Figures

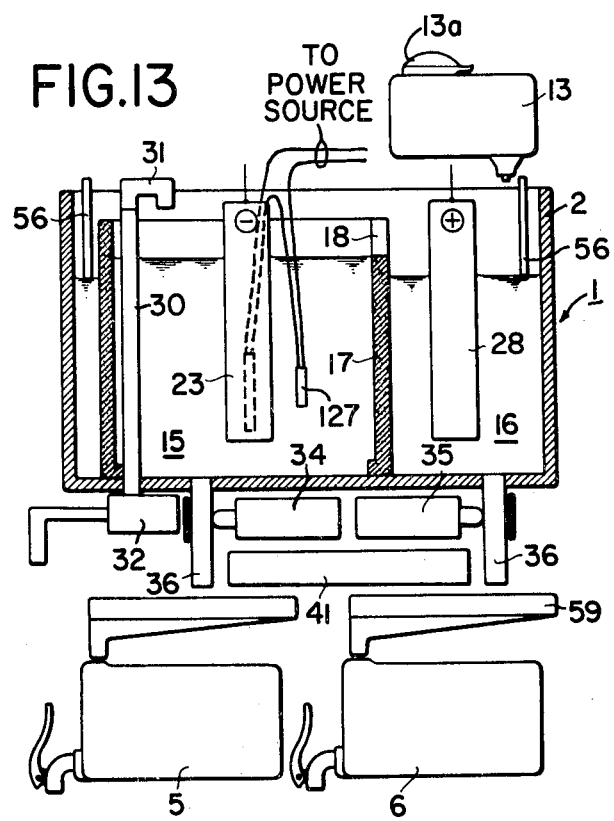
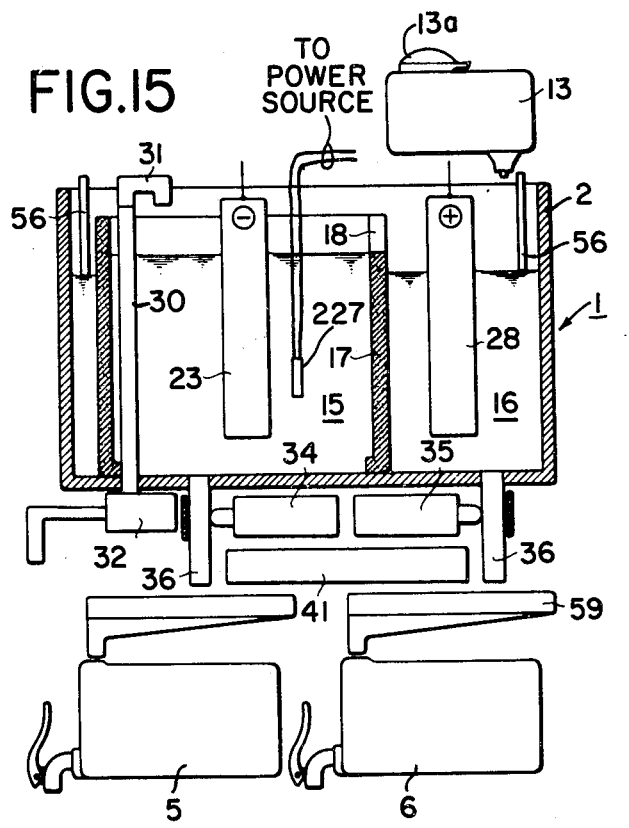

DEVICE FOR REGULATING DRINKING WATER

CROSS REFERENCE TO RELATED APPLICATION

This is a Continuation-In-Part of U.S. application Ser. No. 651,839, filed Jan. 23, 1976, and the entire content thereof is incorporated herein by reference.

BACKGROUND OF THE INVENTION

This invention relates to a device for regulating drinking water, to separate the water into two components having a hydroxyl radical in different densities.

Recently, it has been perceived that drinking water containing abundant cationic particles is useful in promoting health.

This inventor already proposed a device for regulating drinking water including an electrolyzer divided into a negative electrode chamber and a positive electrode chamber by an unglazed partition, and electrodes disposed in the chambers and acting to be energized by direct current for a prescribed time so that the water in the electrolyzer is regulated to be separated into two components having a hydroxyl radical in different densities, due to the electrolysis and electroendosmose.

This device has been improved to regulate drinking water containing an abundance of cationic particles for users without complicated operation, and simultaneously to supply a by-product, i.e., oxiful water which can be used as a beauty lotion or astringent.

An object of this invention is to provide an improved device for regulating drinking water, which contains an abundance of cationic particles and which is substantially free from mineral salts whether or not the water to be regulated is permanent hard water with dissolved salts such as chlorates or phosphates which cannot be precipitated by boiling.

Another object of this invention is to provide an improved device to maintain drinking water in a clean condition in which bubble floatages generated during the electrolysis are removed from the negative electrode chamber.

A further object of this invention is to provide such a device which is electrically safe and sanitary.

SUMMARY OF THE INVENTION

According to the present invention, a device for softening and increasing the pH of drinking water comprises an electrolyzer vessel for receiving water therein; an unglazed partition member dividing the vessel into a negative electrode chamber and a positive electrode chamber; and positive and negative electrodes disposed in the respective positive and negative electrode chambers and adapted to be energized by direct current for a prescribed period of time to separate water in the electrolyzer into two components having a hydroxyl radical in different densities by electrolysis and electroendosmose. The negative electrode has a hollow space therein and has a heating element disposed in the hollow space for warming up the water body in the electrolyzer during the electrolysis to improve the softening of the water. A temperature sensitive means is electrically coupled to the heating element to vary the power supply to the heating element to control the temperature of the water body in the electrolyzer and to avoid overheating of the negative electrode.

BRIEF DESCRIPTION OF THE DRAWINGS

FIG. 13 illustrates another embodiment of the present invention;

FIG. 15 illustrates another embodiment of the present invention.

DETAILED DESCRIPTION

Figure 3:
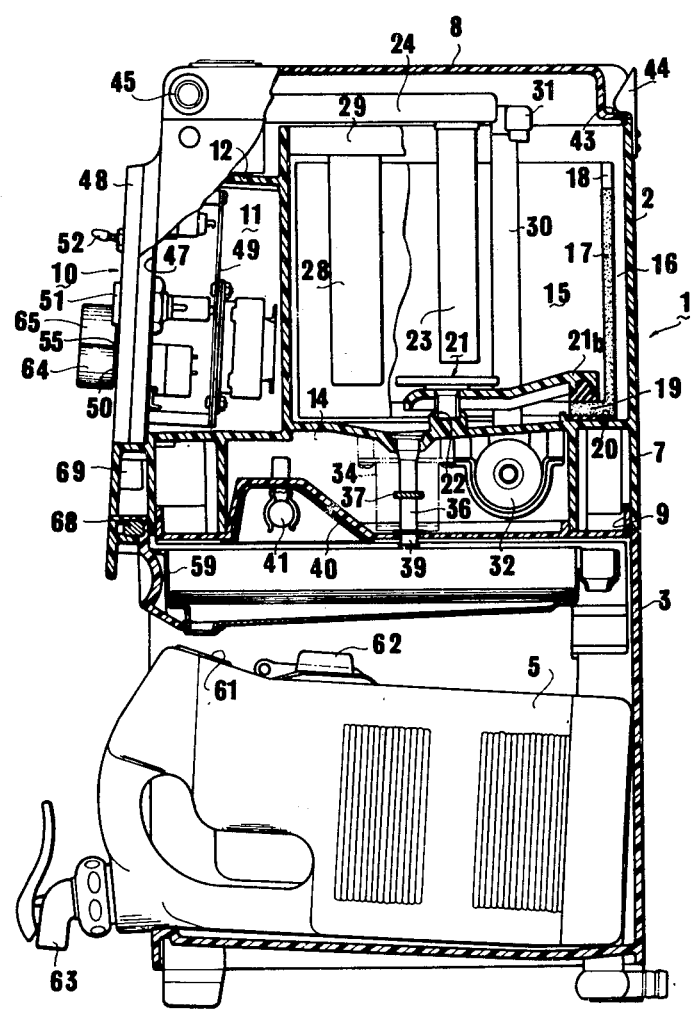
FIG. 3 is a vertical cross-section of the regulating device of FIG. 2.

Referring to FIGS. 1-9, the regulating device of the present invention comprises a water regulating unit 1 having an electrolyzer 2, a base frame 3 (FIG. 2) formed into a box having two compartments 4 therein and two water preserving tanks 5 and 6. As shown in FIG. 3, the water regulating unit 1 includes a unit body 7, a top cover 8, a bottom cover 9 and a control panel assembly 10. The covers 8 and 9 are removably attached to the top and bottom of the unit body 7 respectively. The unit body 7 further has some compartments integrally formed with the electrolyzer 2. Namely, there are provided a control chamber 11 adjacent to the electrolysis bath 2 and having a front opening which is closed in a waterproof manner by the control panel assembly 10 attached to the unit body 7, a stage 12 for receiving an annex tank 13 (FIG. 4) formed on the chamber 11, and a valve setting chamber 14 (FIG. 4) disposed under the electrolysis bath 2 and chamber 11 and having a bottom opening which is closed in a waterproof manner by the bottom cover 9 attached to the unit body 7 by setting screw means.

Figure 4:
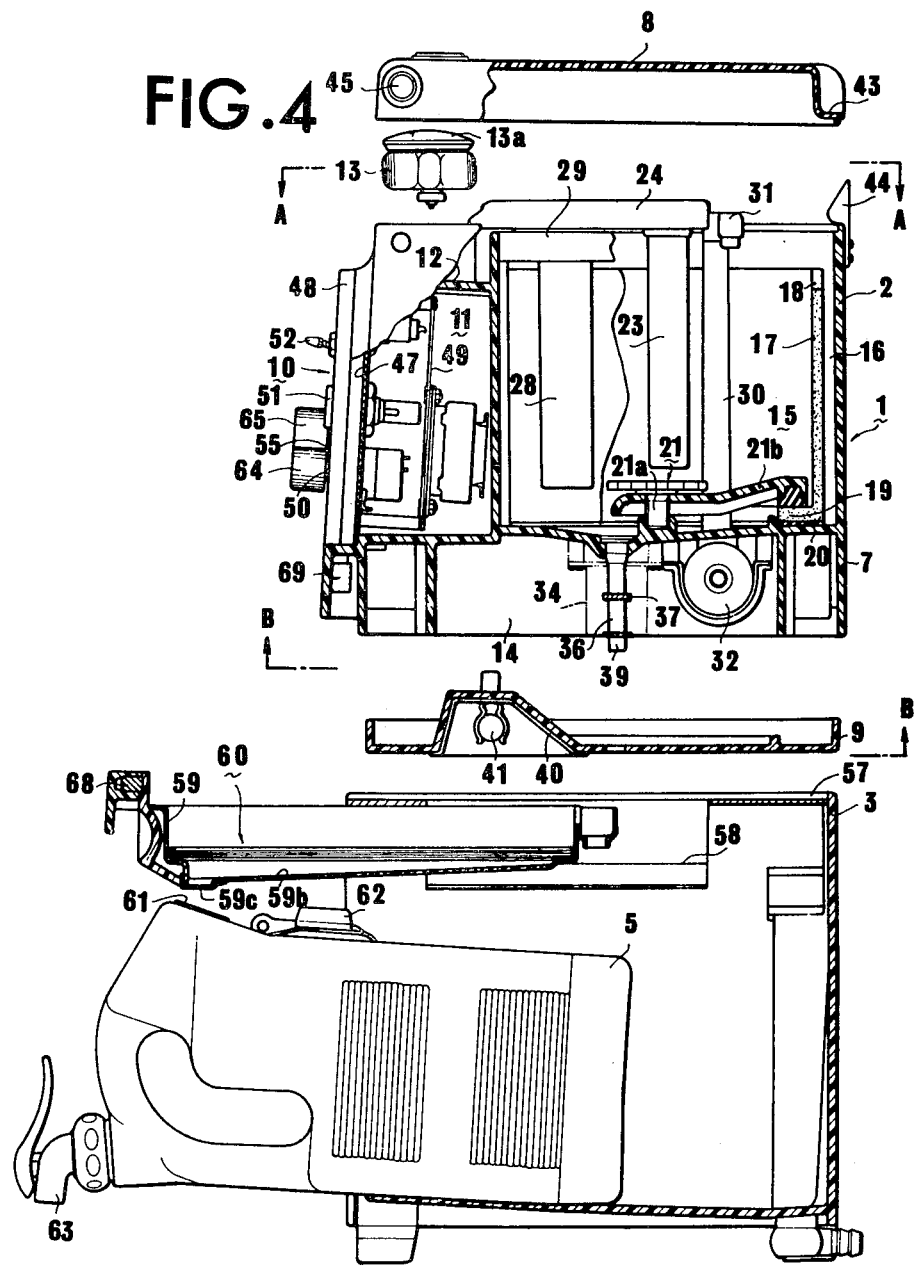
FIG. 4 is a vertical cross-section of the regulating device of FIG. 2 partially demounted.
Figure 5:
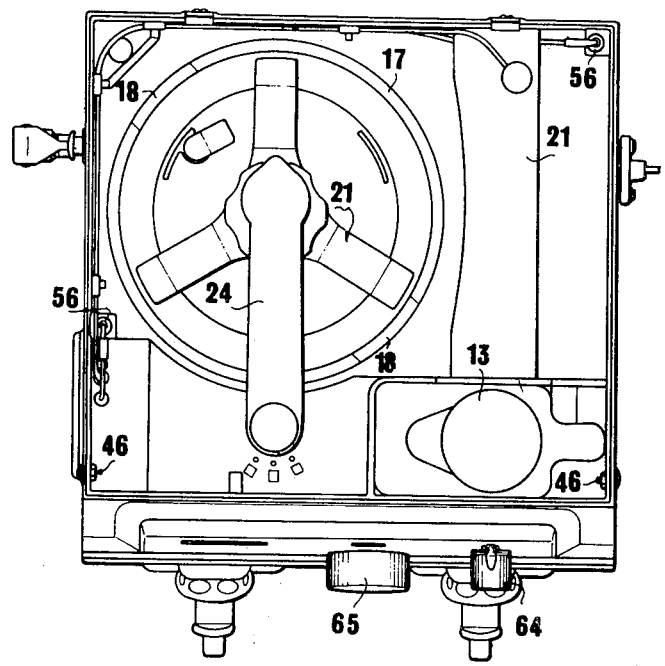
FIG. 5 is a plane view of the regulating device as shown by arrows A—A indicated in FIG. 4.

As seen in FIGS. 3 and 4, the interior of the electrolyzer 2 is divided into a negative electrode chamber 15 and a positive electrode chamber 16 by an unglazed partition 17. The partition 17 is preferably formed into a hollow cylindrical member having 2 to 3 micron diameter pores. The partition 17 has an overflow port 18 formed in the upper edge thereof by cutting a portion thereof off, and an annular inside flange 19 in this embodiment which is mounted on the bottom of the electrolyzer 2 via a resinous packing seat 20 and fixedly set on the bottom by setting screw means 21. The screw means 21 comprises a resin bolt 21a and a resin trivet 21b having a center bore through which the bolt 21a is disengageably screwed to a blind screw bore 22 formed in the bottom of the electrolyzer 2. The trivet 21b further includes arms for depressing the upper side of the inside flange 19 to the bottom of the electrolyzer 2. Accordingly, the chambers 15 and 16 are separated in a manner to communicate through the unglazed partition 17 only by electroendosmose.

The negative electrode chamber 15 has a negative electrode 23 disposed therein. The negative electrode 23 is made of carbon formed into a hollow cylinder. Alternatively, the negative electrode may be made of titanium and if necessary, the titanium electrode may be plated by a metal of the platinum group. The titanium electrode is easy to form into a hollow cylinder and maintains a full strength by itself. The negative electrode 23 hangs from a holder 24, with the top end of the electrode 23 removably attached to the free end of the holder 24. The other end of the holder 24 is pivotally attached to the top of the unit body 7 by setting means in a rigid condition, but is capable of being turned about is pivot when the setting means thereof is released.

Figure 7:
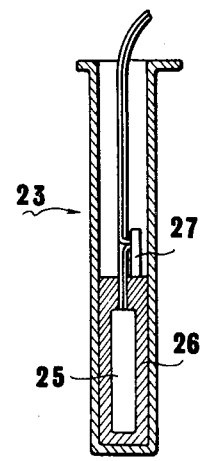
FIG. 7 is a side cross-section of a negative electrode utilized in the regulating device.
Figure 2:
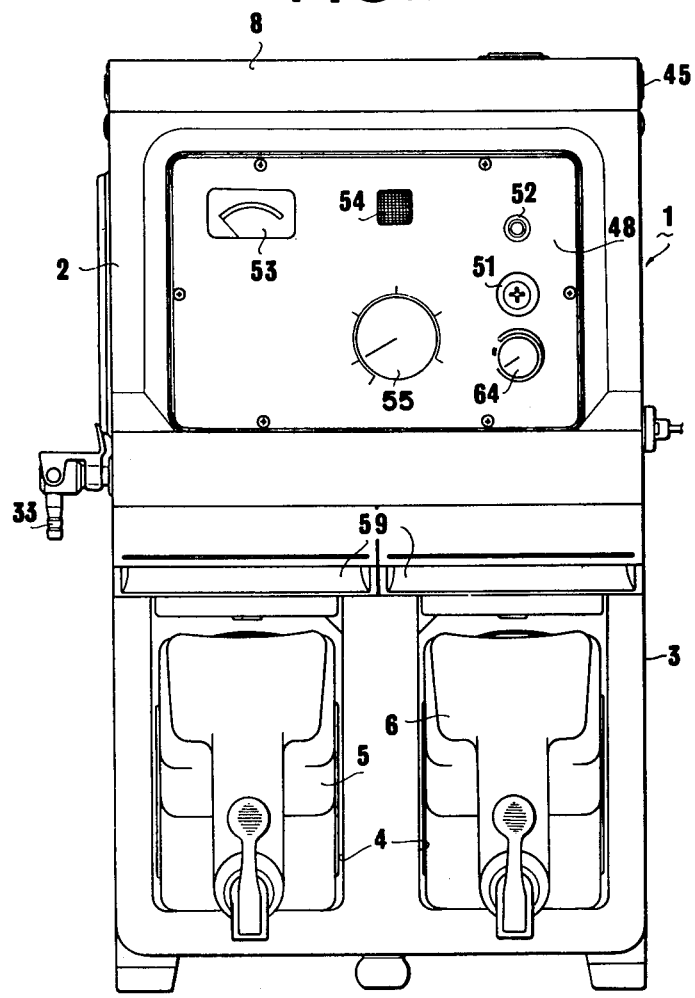
FIG. 2 is a front view of a device for regulating drinking water embodying this invention.

As seen in FIG. 7, in one embodiment of the present invention, the hollow space formed in the negative electrode 23 has a heating element 25 disposed therein. The heating element may be a nickel-chrome wire which is energized by an electric current. An electrically insulating layer 26 is disposed in the hollow space so as to envelop the heating element 25. The hollow space also accommodates a thermistor 127 coupled in series with the heating element 25 to maintain the water temperature in the electrolyzer within a given range or substantially at a given temperature, and to avoid overheating of the electrode 23. The thermistor 127 has a characteristic such that its resistance increases as the temperature thereof increases, thus reducing the electrical power fed to the heating element 25 so as to stabilize the temperature within a given range.

Figure 14:
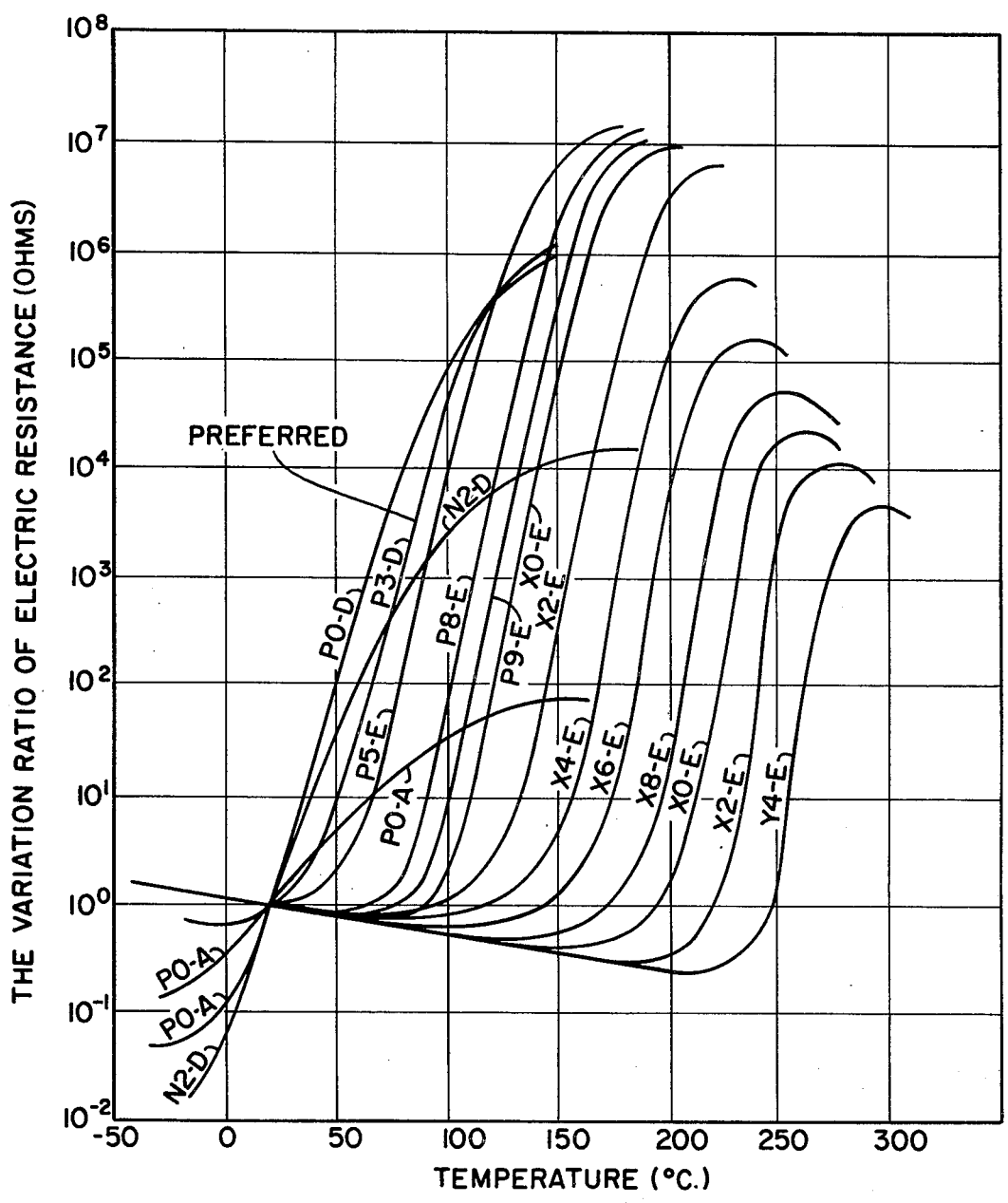
FIG. 14 illustrates the temperature-resistance characteristics of thermistors which are useful in the present invention.

The heating element 25 and thermistor 127 can be replaced by a single unit which combines the function of the heating element and thermistor so as to provide a compact thermally controlled heater. Such combined units, hereafter referred to as "composite element", have characteristics generally as illustrated in FIG. 14. Other such thermistors could also be used depending upon the particular application and characteristics desired. As the temperature of the composite element increases, the controller thereof reduces the electrical current supply to the heating element thereof and thereby reduces the temperature thereof. This stabilizes the temperature of the electrode 23 so as to avoid overheating thereof and to maintain the water temperature at the desired temperature level.

A preferred composite element is indicated in FIG. 14. The characteristics of a preferred composite element are as follows:

Type: TDK-922Y-17E, 751YE-16 (Tokyo Denki Kagaku Co., Ltd.)
A.C. 100-280 Volt, 1.5 ampere,
Endurance temperature of the surface—167° C. ±7
Atmosphere temperature—25° C.
Power: 4.5 watts ±1
Resistance for voltage: 3,000 volts
Starting resistance: 500–3,000
Thermistor used at 50° C. (Max) in waterbody in preferred embodiment.

The thermistor 127 of FIG. 7 may be positioned outside of the negative electrode 23 and be exposed directly to the water in the negative electrode chamber 15, as generally shown in FIG. 13. Exact locations may vary. In this embodiment, the thermistor 127 is series connected with the heating element 25 and the not shown electrical supply.

FIG. 15 illustrates an embodiment of the invention utilizing a composite element (which combines the function of an individual heating element and an individual thermistor) located outside of the negative electrode 23 and which is exposed directly to the water in the negative electrode chamber 15. The exact location of the composite element 227 may vary. The composite element 227 is connected directly with a source of electrical supply (not shown). The preferred composite element indicated in FIG. 14 is also useful for the FIG. 15 embodiment.

The positive electrode chamber 16 surrounds the negative electrode chamber 15 and has two or three positive electrodes 28 of carbon disposed therein. The positive electrodes 28 hang from a holder 29 with their upper ends removably attached to the holder 29 which is supported by the upper portion of the unit body 7 in a manner to step over the positive electrode chamber 15.

In this embodiment, the negative or positive electrode may be made of an unglazed member, the surface of which is plated by gold or platinum metal.

The metal is firstly powder coated to the unglazed member to be baked and is glazed to the surface of the unglazed member when the member is well-tempered.

Figure 1:
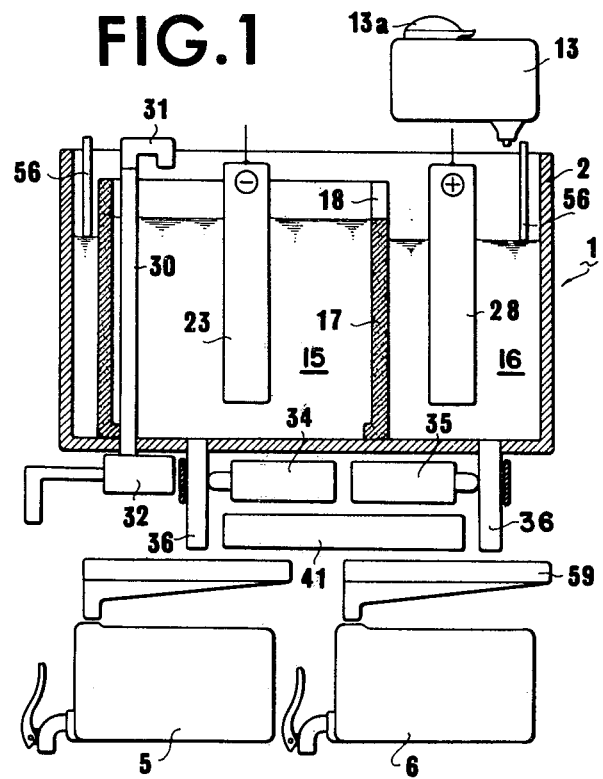
FIG. 1 is a diagrammatical illustration of an embodiment of the present invention.

As best seen in FIG. 1, a water supplying tube 30 is vertically mounted from the bottom of the electrolyzer 2 in a manner to extend through and above the negative electrode chamber 15. To the top of the water supplying tube 30 is attached a bent joint 31 of which the opening is directed to the interior of the negative electrode chamber 15. The water supplying tube 30 communicates through a solenoid valve 32 attached to the top portion of the valve setting chamber 14 to a joint plug 33 (FIG. 2) mounted to the side wall of the unit body 7. The plug 33 is connected to a water supply source in use.

Figure 9:
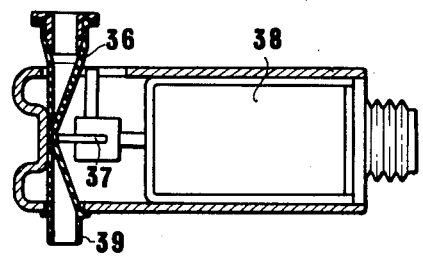
FIG. 9 is a side view of a solenoid valve for use in the regulating device.

The negative and positive electrode chambers 15 and 16 have delivery ports formed in their bottoms respectively. For the delivery ports, solenoid valves 34 and 35 (FIG. 1) are positioned in the valve setting chamber 14 and each has an identical construction. As seen in FIG. 9 and in FIGS. 3 and 4, the solenoid valve arrangement for water delivery includes an elastic tube 36, a pincher 37 for pinching the tube 36 to shut the water communication, and a solenoid means 38 for operating the pincher 37 when it is energized. The elastic tube 36 of each of the solenoid valves communicates with the delivery port and is connected to a short nozzle 39 penetrating the bottom cover 9.

Figure 6:
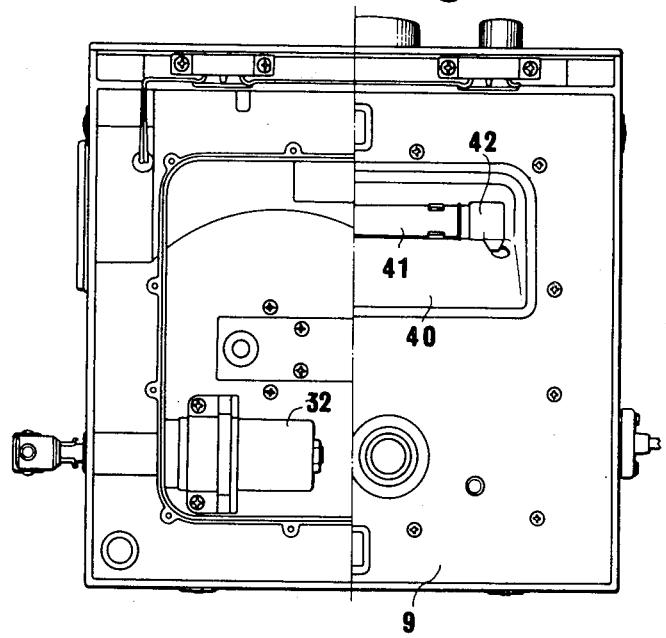
FIG. 6 is a bottom view of the regulating device as shown by arrows B—B indicated in FIG. 4.

Referring to FIGS. 3 and 4, the bottom cover 9 has a lower opened recess 40 of which the inner surface is plated by metal so as to be formed as a reflector, and a sterilizing lamp 41, for example, an ultraviolet lamp which is disposed in the recess 40 and supported by receptacles 42 (FIG. 6).

The annex tank 13 (FIG. 4) located on the stage 12 is formed as a squirt type tank having an elastic pusher member 13a so that a water solution of calcium lactate is squirted out by pushing the pusher member 13a into the water in the positive electrode chamber 16. The pusher member 13a projects out through a bore formed in the top cover 8, so that the tank 13 can be operated with the top cover 8 being attached to the unit body 7.

The top cover 8 has two grooves 43 formed to the backside thereof so as to be engaged with hooks 44 of spring steel which are attached to the backside of the unit body 7. The top cover 8 further has two releasing pushers 45 having lock plates (not shown). Two lock pins 46 (FIG. 5) are mounted on the inner side walls of the unit body 7, so that the lock plates can be engaged with the lock pins 46 in the top cover 8 regularly setting on the unit body 7, while the lock plates can be disengaged from the lock pins 46 when the pushers 45 are pushed.

The control panel assembly 10 includes an indicating panel 47 (FIGS. 3 and 4), a transparent window panel 48 spaced in front of the indicating panel 47 and a supporting frame 49 attached to the backside of the indicating panel 47 and disposed in the control chamber 11.

To the indicating panel 47 are attached a rotary voltage regulator 50 with a control knob 64, a fuse holder 51, an on-off switch 52, an ammeter 53 for electrolysis, a pilot lamp 54, and a timer 55 with a control knob 65. The control shafts of the voltage regulator 50 and timer 55 penetrate the transparent window panel 48 to project out of the control panel assembly 10. To the bores of the panel 48 through which the shafts pass should be provided water-seal mechanisms. The other electric elements are attached to the supporting frame 49.

In order to detect the finishing of the water supply, water level responsive touch-switch elements 56 (FIG. 5) are mounted at the opposite corners of the positive electrode chamber 16.

The base frame 3 includes an upper stage 57 (FIG. 4) to which the water regulating unit 1 is removably attached, and racks 58 disposed under the upper stage 57.

Two trays 59 are set on the racks 58 and filter assemblies 60 are laid on the bottoms of the trays 59, so that water from the chambers 15 and 16 through the valves 34 and 35 respectively falls down to the trays and after the percolation is put in the tanks.

Figure 8:
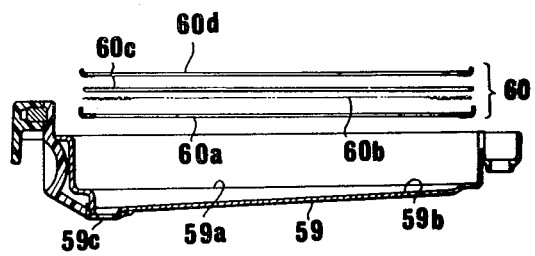
FIG. 8 is a side cross-section of a tray and a filter assembly for use in the regulating device.

As best seen in FIG. 8, the tray 59 has an inner flange 59a for supporting the peripheral edge of the filter assembly 60, an inclined bottom 59b and a pouring port 59c.

The filter assembly 60 comprises a rectangular core 60a having a shallow inside flange, a basic net 60b of stainless steel wire stretched on the core 60a with its edge welded to the core flange, a filter element 60c, for example, a felt mat superposed on the net 60b, and a supporting core 60d tightly inserted into the core 60a to depress the side edges of the filter element 60c to the net 60b.

As seen in FIGS. 3 and 4, each of the tanks 5 and 6 has an inlet port 61 with a cap 62 which is positioned under the pouring port 59c when the tank is regularly set in the compartment 4. The tank further includes a cock valve 63 used with the tank being set in the compartment 4.

Figure 10:
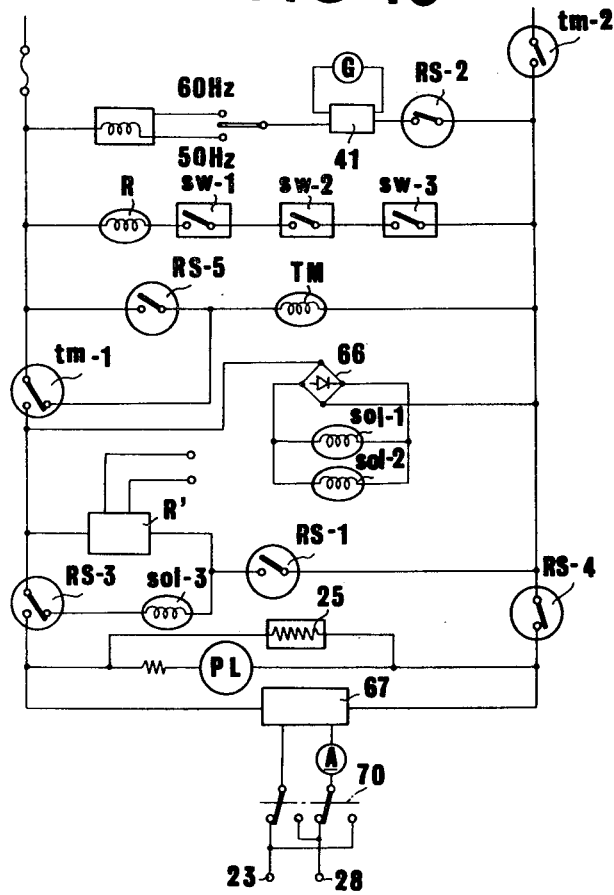
FIG. 10 is an electric circuit for the regulating device embodying this invention.

In operation, the control knob 64 for the voltage regulator 50 is adjusted to obtain a voltage between the electrodes 23 and 28 matching the water quality, and the knob 65 for timer 55 is operated to cause timer switches tm-1 and tm-2 to be closed and to thereby energize solenoid coils sol-1 and sol-2 of the solenoid means 38 through a diode rectifier 66 and a relay R (see FIG. 10). By energizing the solenoid coils sol-1 and sol-2, the pinchers 37 pinch the tube 36 to shut the water passage.

By energizing the relay R, relay switches RS-1 and RS-2 are closed to energize the sterilizing lamp 41, and to energize the solenoid coil sol-3 of the valve 32 to thereby operate the valve 32 to its opened position, and simultaneously the touch switch elements 56 are set in a detecting position. After the negative electrode chamber 15 is filled, the water passes through the overflow port 18, and is introduced into the positive electrode chamber 16. When the water flows over the partition 17, floatage, such as dust, contained in the supplied water is carried from the negative electrode chamber 15 to the positive electrode chamber 16.

The touch switch elements 56 detect the finishing of the water supply as the positive electrode chamber 16 fills up with water to a prescribed level, and relay R' is energized so that relay switches RS-3, RS-4 and RS-5 are switched to cause the direct current to be supplied to the electrodes 23 and 28 for electrolysis. Simultaneously, the circuit for timer motor TM is closed. When the relay switch RS-3 is switched, the solenoid coil sol-3 is de-energized to stop the water supply at the time, or before, the electrolysis is started. Also, the pilot lamp PL is energized. In this case, alternating current is changed to direct current by means of a rectifier 67. Simultaneously, the heating element 25 is energized to warm up the water bodies in the chambers 15 and 16 during the electrolysis and electroendosmose.

Figure 11:
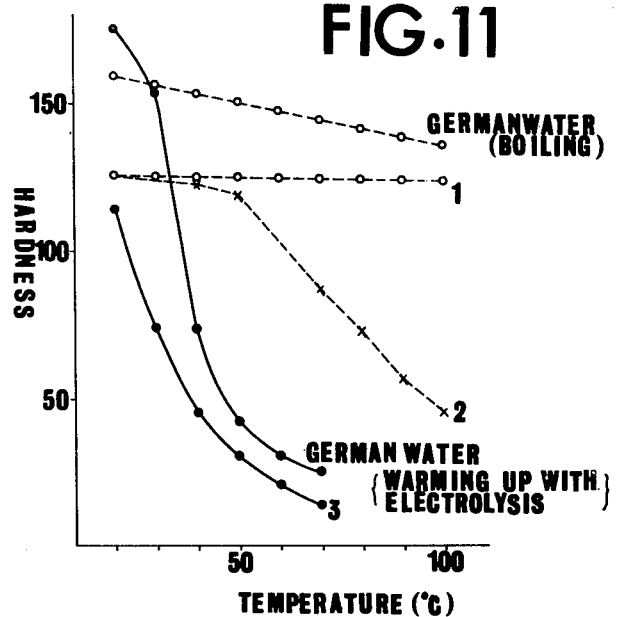
FIG. 11 is a graph showing variation of hardness of water samples as a function of water temperature.
Figure 12:
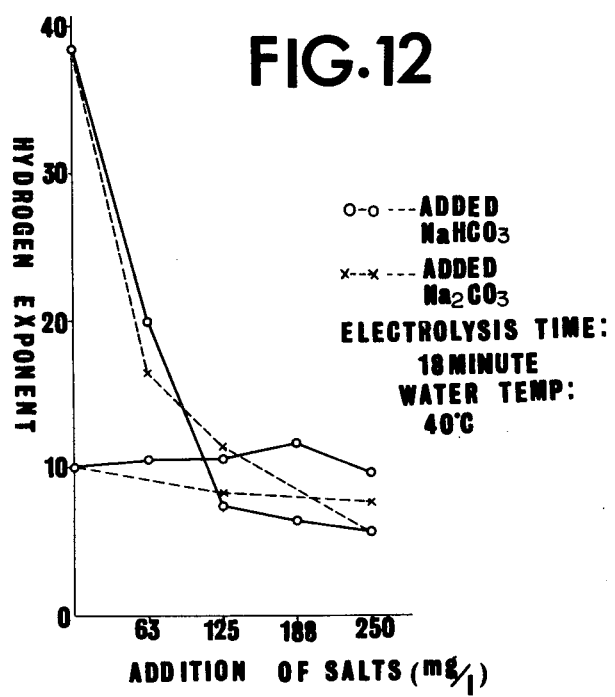
FIG. 12 is a graph showing variation of ion density of water samples as a function of the addition of salt.

The effect of heating of water together with such electro-operations may be better understood from test results indicated in FIGS. 11 and 12. Namely, the permanent hard water, which is a sample of Japanese well water, cannot be precipitated by boiling only as shown by a dash line (1) in FIG. 11. In order to soften the permanent hard water, it has been well known to add carbonates to the water. However, this method is carried out on the condition that the water should be boiled above 100 degrees centigrade with carbonates added thereto so that the water barely has 50 hardness, as shown by a dash line (2) in FIG. 11. The method for heating water at the time of electrolysis according to this invention results in fully softening the water at about 35 degrees centigrade by adding carbonates (250 mg/l, 18 minutes for electrolysis) as shown by a solid line (3) in FIG. 11. Provided the water originally contains carbonates or bicarbonates such as a German water taken as a sample in this test, it is not necessary to add additional carbonates.

The Japanese well water and German water mentioned above have respective characteristics as follows.

|  | Japanese Water | German Water | Japanese Water (adding NaHCO$_3$) |
|---|---|---|---|
| Hydrogen exponent (pH) | 6.36 | 7.82 | 7.22 |
| Hardness | 125 | 160 | 125 |
| BCP Alkali exponent | 0.49 meq/l | 2.56 | 3.46 |
| Electrolysis |  |  |  |
| Alkali side (pH) | 10.1 | 9.8 | 9.8 |
| Acid side (pH) | 3.1 | 6.2 | 6.0 |
| Hardness of Alkali water | 136 | 74 | 65 |

(Wherein NaHCO$_3$ of 250 mg/l is added, Electrolysis time is 18 minutes and the temperature is 40° C.)

Since the Japanese well water has a small BCP Alkali exponent as compared with the German water so as to maintain carbonic ions slightly as electrolysis, the water in the negative electrode chamber 15 (in the alkali side) has a large hardness and the water in the positive electrode chamber 16 (in the acid side) has a low hydrogen exponent. Such water is generally called permanent hard water.

In contradistinction, the German water has a large BCP Alkali exponent as electrolysis, the water in the negative electrode chamber has a small hardness and the water in the positive electrode chamber approximately maintains the same hydrogen exponent as that before electrolysis. Such water is generally called a temporarily hard water.

When the Japanese water has carbonates added thereto during the electrolysis, the water in the negative electrode chamber has a small hardness and the water in the positive electrode chamber approximately maintains the same hydrogen exponent as that before electrolysis. Such a phenomenon is explainable as follows.

Namely, the water in the negative electrode chamber obtains ions such as $Ca^{++}$, $Mg^{++}$ and $OH^-$ during electrolysis. If the water fully maintains carbonic ions, it is assumed that the ions are precipitated as insolvent carbonates as follows.

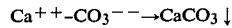
$$Ca^{++} - CO_3^{--} \rightarrow CaCO_3 \downarrow$$

The water in the positive electrode chamber obtains ions such as $Cl^-$, $SO_4^{--}$, $HCO^-$ and $H^+$ during electrolysis. If the water fully maintains carbonic ions, it is assumed that the hydrogen ions are expendible by processing the reaction from the left side to the right side as follows.

$$H^+ + HCO_3^{--} \rightarrow H_2O + CO_2$$

Consequently, this invention has an advantage of easily inducing softening of the hard water by warming up the water during the electrolysis. The water may also be warmed before the electrolysis.

When the electrolysis, the duration of which is decided by the timer setting, is completed, first the timer switch tm-1 is switched to be opened so that the electrolysis ceases, and the solenoid coils sol-1 and sol-2 are de-energized. Accordingly, the valve 32 is closed and the valves 34 and 35 are opened, to thereby permit water to fall down to the trays 59.

The water is sterilized by the beam of the ultra-violet lamp 41 flowing in the trays 59 and percolating with the filter assembly 60.

The touch-switches 56 are released due to the lowering of the water level in the electrolyzer so that relay switches RS-3, RS-4 and RS-5 are switched in turn.

After all the water has poured from the ports 59c through the inlet ports 61 into the tanks 5 and 6, the timer 55 supplies an electrical signal to the timer switch tm-2 to cause it to be switched. Then, the timer motor TM is stopped, the ultra-violet lamp 41 and relay R are de-energized, and the relay switches RS-1 and RS-2 are opened.

In this embodiment, the sterilizing lamp 41 can be energized during the time the electrodes have voltage applied thereto, so that the interiors of the trays 59 are clarified or sterilized before receipt of the water.

If the water is a low conductivity water, the voltage is regulated basically by varying the distance between the negative and positive electrodes 23 and 28 by adjusting the holder 24 by turning.

In order to avoid malfunctioning when the water regulating unit 1 is disengaged from the base frame 3, or the top cover 8 or one of the trays 59 is removed or is set in only halfway, there are provided safety switch means in the water regulating unit 1. Each of the safety switch means includes a magnet 68 which is embedded in the upper portion of the base frame 3 (the under portion of top cover 8 and the handle portion of the tray 59) and a reed switch 69 which is attached to the suitable portion of the unit body 7 in correspondence with the embedded portion. Such switches 69 are indicated in FIG. 10 as reference characters sw-1, sw-2 and sw-3.

When the unit body 7 is regularly set on the base frame 3, the top cover 8 on the unit body 7 and the trays 59 on the racks, the reed switches 69 are closed under the influence of the magnetic field caused by the magnet 68.

In this embodiment, change-over switches 70 are positioned between the electrodes and rectifier 67 and are manually operatable so that the negative electrode 23 passes the direct current in the reverse direction to thereby cause the adhesion to be stripped off from the surface thereof.

I claim:

1. An electrolyzer device for softening and increasing the pH of drinking water comprising:
an electrolyzer vessel for receiving water therein;
an unglazed partition member dividing said vessel into a negative electrode chamber and a positive electrode chamber;
positive and negative electrodes disposed in the respective positive and negative electrode chambers and adapted to be energized by direct current for a prescribed period of time to separate water in the electrolyzer into two components having a hydroxyl radical in different densities by electrolysis and electroendosmose;
the negative electrode positioned in the negative electrode chamber having a hollow space therein;
a heating element coupled to a source of electrical power and disposed in said negative electrode chamber for warming up the water body in the electrolyzer during the electrolysis to improve softening of the water in the negative electrode chamber and to increase the pH of the water; and
temperature sensitive means electrically coupled to said heating element to vary the power supply to said heating element to control the temperature of said water body in said electrolyzer and to avoid overheating of said negative electrode.

2. The device of claim 1 wherein said temperature sensitive means comprises a thermistor.

3. The device of claim 2 wherein said thermistor is connected in series with said heating element.

4. The device of claim 2 wherein at least said thermistor is disposed in said hollow space of said negative electrode.

5. The device of claim 2 wherein at least said thermistor is disposed in said negative electrode chamber and in communication with the water in said negative electrode chamber.

6. The device of claim 1 wherein said temperature sensitive means is connected in series with said heating element.

7. The device of claim 1 wherein at least said temperature sensitive means is disposed in said hollow space of said negative electrode.

8. The device of claim 1 wherein said temperature sensitive means is connected in series with said heating element.

9. The device of claim 1 wherein said negative electrode has an insulating layer in its hollow space to envelop said heating element, and including means for supplying to said heating element an electrical power having a high voltage different from that supplied to the electrodes.

10. The device of claim 1 wherein said negative electrode disposed in said negative electrode chamber is made of titanium formed into a hollow cylinder, with its hollow space being waterproof.

11. The device of claim 10 wherein said titanium electrode has an outer surface plated by a metal of the platinum group.

12. The device of claim 1 comprising means for adjustably positioning at least one of said negative and positive electrodes in its respective electrode chamber to change the distance between said negative and positive electrodes.

13. The device of claim 12 wherein said adjustable positioning means includes a holder supporting said at least one electrode, said holder being turnable at an angle to change said distance.

14. The device of claim 1 wherein said partition has an overflow port formed at the upper edge thereof so that bubble floatages generated during the electrolysis are carried from the negative electrode chamber to the positive electrode chamber through said overflow port.

15. The device of claim 1 including a water supply source only directed to said negative electrode chamber, so that the water is supplied from the negative electrode chamber to the positive electrode chamber by means of the water overflowing the upper edge of said partition.

16. The device of claim 1 further comprising a water regulating unit including an electric control system mounted in a waterproof area adjacent to the electrolyzer; a base frame having two compartments therein and an upper stage to which the water regulating unit is removably attached; and two water tanks removably received in respective ones of said compartments and adapted to receive the treated water therein.

17. The device of claim 16 wherein said base frame includes racks disposed under the upper stage, trays are set on the racks, and filter elements laid on the bottoms of the trays, so that the water from said chambers respectively fall down the trays and, after percolation through the filter elements flows to said tanks.

18. The device of claim 16 including a sterilizing lamp coupled to a power supply and attached to a holder disposed under a reflector located at the bottom of the water regulating unit, for producing a sterilizing beam directed to the water flowing in the trays.

19. The device of claim 16 further comprising a safety switch means coupled to the water regulating unit and to said electrodes for switching off the direct current supply for the electrodes when the water regulating unit is disengaged from the base frame.

20. The device of claim 16 further comprising a safety switch means coupled to the water regulating unit and to said electrodes for switching off the direct current supply for the electrodes when at least one of said trays is at least partially removed from its respective compartment.

21. The device of claim 18 further comprising a safety switch means coupled to the water regulating unit and to said sterilizing lamp for switching off the current supply for the sterilizing lamp when the water regulating unit is disengaged from the base frame.

22. The device of claim 18 further comprising a safety switch means coupled to the water regulating unit and to said sterilizing lamp for switching off the current supply for the sterilizing lamp when at least one of said trays is at least partially removed from its respective compartment.

23. The device of claim 1 wherein said temperature sensitive means and heating element comprise a composite thermally controlled heating unit.

24. The device of claim 23 wherein said combined thermally controlled heating unit is disposed in said hollow space of said negative electrode.

25. The device of claim 23 wherein said combined thermally controlled heating unit is disposed in said electrode chamber and in communication with the water in said negative electrode chamber.

26. An electrolyzer device for softening and increasing the pH of drinking water comprising:
   an electrolyzer vessel for receiving water therein;
   an unglazed partition member dividing said vessel into a negative electrode chamber and a positive electrode chamber;
   positive and negative electrodes disposed in the respective positive and negative electrode chambers and adapted to be energized by direct current for a prescribed period of time to separate water in the electrolyzer into two components having a hydroxyl radical in different densities by electrolysis and electroendosmose;
   the negative electrode positioned in the negative electrode chamber having a hollow space therein; and
   a thermally controlled heating device coupled to a source of electrical power and disposed in the negative electrode chamber for warming up the water body in the electrolyzer during the electrolysis to improve the softening of the water in the negative electrode chamber and to increase the pH of the water, said thermally controlled heating device controlling the temperature of said water body in said electrolyzer within a predetermined range.

27. The device of claim 26 wherein said combined thermally controlled heating device is disposed in said hollow space of said negative electrode, said temperature being controlled to also avoid over-heating of said negative electrode.

* * * * *